United States Patent
Shen et al.

(10) Patent No.: US 11,511,870 B2
(45) Date of Patent: Nov. 29, 2022

(54) PARACHUTE DEVICE FOR DRONE AND METHOD FOR OPENING PARACHUTE THEREOF

(71) Applicant: Industrial Technology Research Institute, Hsin-Chu (TW)

(72) Inventors: Tzu-Chieh Shen, Taipei (TW); Kuo-Hung Lin, Hsinchu (TW)

(73) Assignee: INDUSTRIAL TECHNOLOGY RESEARCH INSTITUTE, Hsin-Chu (TW)

( * ) Notice: Subject to any disclaimer, the term of this patent is extended or adjusted under 35 U.S.C. 154(b) by 110 days.

(21) Appl. No.: 17/098,486

(22) Filed: Nov. 16, 2020

(65) Prior Publication Data

US 2022/0073209 A1 Mar. 10, 2022

(30) Foreign Application Priority Data

Sep. 4, 2020 (TW) ................. 109130354

(51) Int. Cl.
 *B64D 17/80* (2006.01)
 *B64D 17/76* (2006.01)
 *B64D 17/70* (2006.01)

(52) U.S. Cl.
 CPC ............. *B64D 17/80* (2013.01); *B64D 17/70* (2013.01); *B64D 17/76* (2013.01)

(58) Field of Classification Search
 CPC ....... B64D 17/70; B64D 17/72; B64D 17/725
 See application file for complete search history.

(56) References Cited

U.S. PATENT DOCUMENTS

| | | | |
|---|---|---|---|
| 5,887,825 | A | 3/1999 | Noel |
| 10,004,652 | B1 | 6/2018 | Groden et al. |
| 10,351,249 | B2 | 7/2019 | Mitchell et al. |
| 10,414,506 | B2 | 9/2019 | Homan et al. |
| 10,421,552 | B2 | 9/2019 | Tsaliah et al. |
| 2007/0266884 | A1 | 11/2007 | Finneral et al. |
| 2009/0308979 | A1 | 12/2009 | Nadir |
| 2015/0314881 | A1 | 11/2015 | Tsaliah et al. |
| 2016/0221681 | A1* | 8/2016 | Babovka ............... B64D 17/80 |
| 2016/0251083 | A1 | 9/2016 | Tsaliah et al. |

(Continued)

FOREIGN PATENT DOCUMENTS

| | | |
|---|---|---|
| CN | 2452586 Y | 10/2001 |
| CN | 101823560 A | 9/2010 |

(Continued)

OTHER PUBLICATIONS

Zhu Yong et al, "Parachute Decelerate Trajectory Optimization Design Based on Genetic Algorithm", 2009, IEEE.

(Continued)

*Primary Examiner* — Richard G Davis
(74) *Attorney, Agent, or Firm* — WPAT, PC

(57) ABSTRACT

A parachute device for drone includes a container, a power source, a base, a parachute body and an open-assist member. A top of the container has an opening. The power source is disposed on a bottom of the container. The base is disposed on the power source. The parachute body, disposed on the base, is in a folded status. The open-assist member is disposed in the parachute body. The open-assist member contacts the base and the center of the inner surface of the parachute body.

18 Claims, 15 Drawing Sheets

(56) References Cited

U.S. PATENT DOCUMENTS

| | | | | |
|---|---|---|---|---|
| 2016/0318615 A1* | 11/2016 | Pick | ........................ | B64D 17/54 |
| 2016/0332738 A1* | 11/2016 | Hiisila | .................... | F41A 19/58 |
| 2016/0368610 A1 | 12/2016 | Erickson | | |
| 2017/0225792 A1* | 8/2017 | Wang | .................... | B64C 39/024 |
| 2018/0050805 A1 | 2/2018 | Kalinka | | |
| 2019/0112058 A1 | 4/2019 | Swan et al. | | |
| 2020/0255157 A1* | 8/2020 | Bachmann | ............. | B64D 17/64 |
| 2021/0031930 A1* | 2/2021 | Na | ........................... | B60L 50/60 |
| 2021/0155343 A1* | 5/2021 | Ogden | .................. | B64C 39/024 |
| 2021/0206497 A1* | 7/2021 | Yagihashi | ............... | B64C 39/024 |
| 2022/0055732 A1* | 2/2022 | Bergeron | ............... | B64D 17/70 |

FOREIGN PATENT DOCUMENTS

| | | |
|---|---|---|
| CN | 110406682 A | 11/2019 |
| CN | 111232221 A | 6/2020 |
| TW | I568641 B | 2/2017 |
| TW | M544472 | 7/2017 |
| WO | WO2016025444 A1 | 2/2016 |

OTHER PUBLICATIONS

Mingjun Li et al., "Improved digital model of parafoilunmanned aerial vehicle accurate recycling system", Proceedings of 2016, IEEE Chinese Guidance, Navigation and Control Conference, pp. 1857-1863, Aug. 12-14, 2016 Nanjing, China.

Han Wu et al., "Modeling of Small UAV Parachute Recovery System Based on Lagrangian Method", Proceedings of 2019 IEEE International Conference on Mechatronics and Automation Aug. 4-7, Tianjin, China, pp. 1127-1132.

Inhan Kim et al., "Prediction of the parachute deploy for landing at the desired point", SICE Annual Conference 2012 Aug. 20-23, 2012, Akita University, Akita, Japan pp. 1629-1634.

Pengyuan Shao et al., "Research on key problems in assignedpoint recovery of UAV using parachute", 2013, IEEE.

Jintasit Pravitra et al, "A minimalistic wind estimation method for small unmanned aircraft", 2016 Second Asian Conference on Defence Technology (ACDT).

Agus Hasan et al., "Model-Based Fail-Safe Module for Autonomous Multirotor UAVs with Parachute Systems", 2019 International Conference on Unmanned Aircraft Systems (ICUAS), Atlanta, GA, USA, Jun. 11-14, 2019, pp. 406-412.

* cited by examiner

PARACHUTE DEVICE FOR DRONE AND METHOD FOR OPENING PARACHUTE THEREOF

CROSS REFERENCE TO RELATED APPLICATION

This application claims the benefits of Taiwan application Serial No. 109130354, filed on Sep. 4, 2020, the disclosures of which are incorporated by references herein in its entirety.

TECHNICAL FIELD

The present disclosure relates in general to a parachute device, and more particularly to a parachute device for drone, and to a method for opening the parachute device for drone.

BACKGROUND

With the development of technology, drone's technology has also significantly improved. In order to prevent the drone from crashing, more and more safety measures have been introducing. One of these measurements is to equip the drone with a parachute. While the drone functions abnormally, a control system would detect immediately parameters and attitude of the drone so as to determine whether or not the drone needs to take safety measures automatically, or to have the operator to directly issue necessary instructions. Nevertheless, for drones, the parachute is an effective and reliable safety measure that can ensure a safe landing while in meeting unbalanced attitude or a speed loss. Thereupon, the risk of a direct drone crash can be reduced.

SUMMARY

In accordance with one embodiment of this disclosure, a parachute device for drone includes a container, a power source, a base, a parachute body and an open-assist member. A top of the container has an opening. The power source is disposed on a bottom of the container. The base is disposed on the power source. The parachute body, disposed on the base, is in a folded status. The open-assist member is disposed in the parachute body. The open-assist member contacts the base and the center of the inner surface of the parachute body.

In accordance with one embodiment of this disclosure, a method for opening a parachute of drone includes: disposing a power source into a container on a bottom thereof; disposing a base on the power source; disposing an open-assist member into a parachute body in a folded status; disposing the parachute body onto the base, and having the open-assist member to contact the base and a center of an inner surface of the parachute body; activating the power source to generate a thrust for pushing the base; and, having the base and the open-assist member to keep contacting the center of the inner surface of the parachute body, so that the parachute body is pushed out of the container and then expands into a parachute-open status.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DETAILED DESCRIPTION

Figure 1:
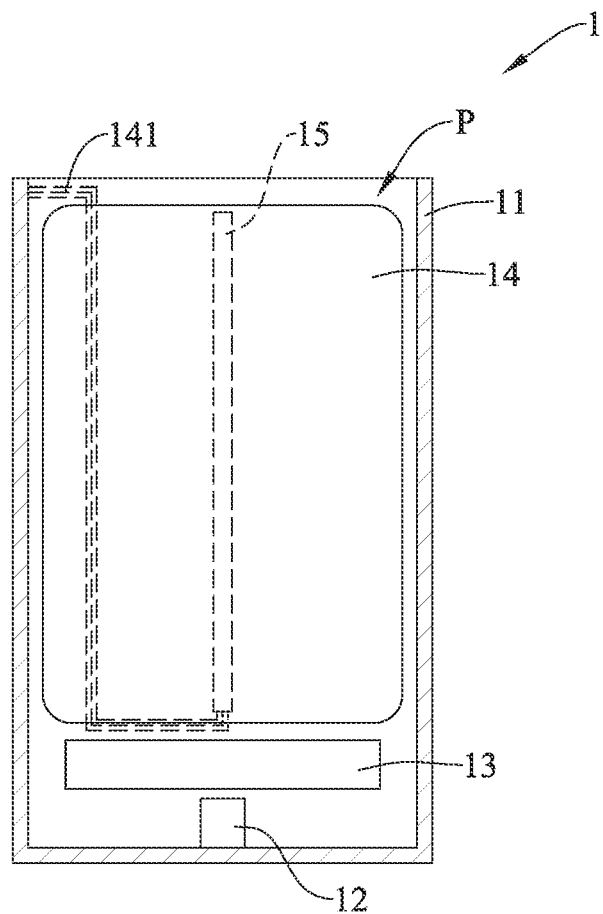
FIG. 1 is a schematic cross-sectional view of an embodiment of the parachute device for drone in accordance with this disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Referring to FIG. 1, a schematic cross-sectional view of an embodiment of the parachute device for drone in accordance with this disclosure is shown. In this embodiment, parachute device for drone 1 includes a container 11, a power source 12, a base 13, a parachute body 14 and an open-assist member 15.

The container 11 has an opening P at a top thereof. In this embodiment, the container 11 is a hollow cylindrical container. In another embodiment, the container 11 can be also a hollow polygonal container or any shape the like that meets practical requirements.

The power source 12 is disposed on a bottom of the container 11. In this embodiment, the power source 12 is a compressed gas device, such as a $CO_2$ compressed gas device. In another embodiment, the power source 12 can be also a spring, a chemical kit, or any device that can release kinetic energy.

The base 13, disposed on the power source 12, is structured to match the power source 12. In this embodiment, the base 13 is a planar base. In another embodiment, the base 13 can be the like structure.

The parachute body 14, disposed on the base 13, is stored in a folded status above the base 13 inside the container 11. The open-assist member 15 is disposed in the parachute body 14. In FIG. 1, the open-assist member 15 is a pole having two opposite ends. One end of the open-assist member 15 contacts at a center of an inner surface of the parachute body 14, while another end thereof contacts against the base 13. In this embodiment, the altitude of the end of the open-assist member 15 that contacts the center of the inner surface of the parachute body is about equal to the altitude of the opening P of the container 11. In another embodiment, the open-assist member 15 can be differently structured to some other relevant member such as a supportive object, an elastic support or a retractable part.

In addition, a plurality of parachute cords 141 (dashed lines in the figure) are included to connect the parachute body 14. The plurality of parachute cords 141 can be fixed to the container 11. In another embodiment, the plurality of parachute cords 141 can be also fixed to the body of the drone that is equipped with the parachute device 1.

The aforesaid embodiment is not used to provide limitations the scope of this disclosure, but one of many exemplary examples. Definitely, structuring, connecting and assembling of elements of the aforesaid parachute device for drone 1 can be varied according to different requirements.

Referring to FIG. 2A~FIG. 2E, different stages of a parachute-opening process of the parachute device for drone of FIG. 1 are demonstrated orderly and schematically.

Figure 2A:
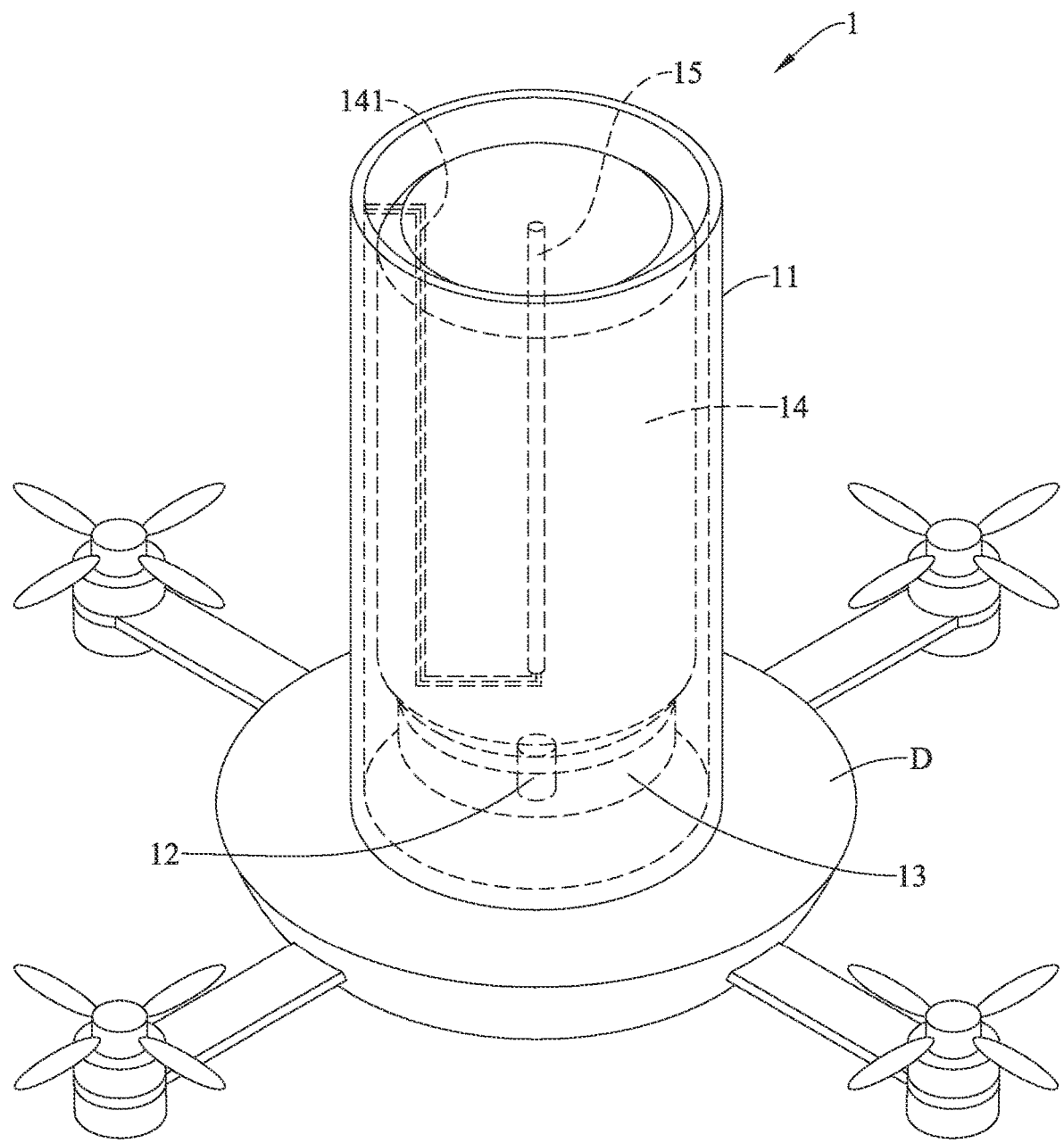
FIG. 2A~FIG. 2E demonstrate orderly and schematically different stages of a parachute-opening process of the parachute device for drone of FIG. 1.

As shown in FIG. 2A, while the opening device for the parachute of drone 1 is positioned on the drone D, the parachute body 14 is collected inside the opening device 1 in the folded status.

Figure 2B:
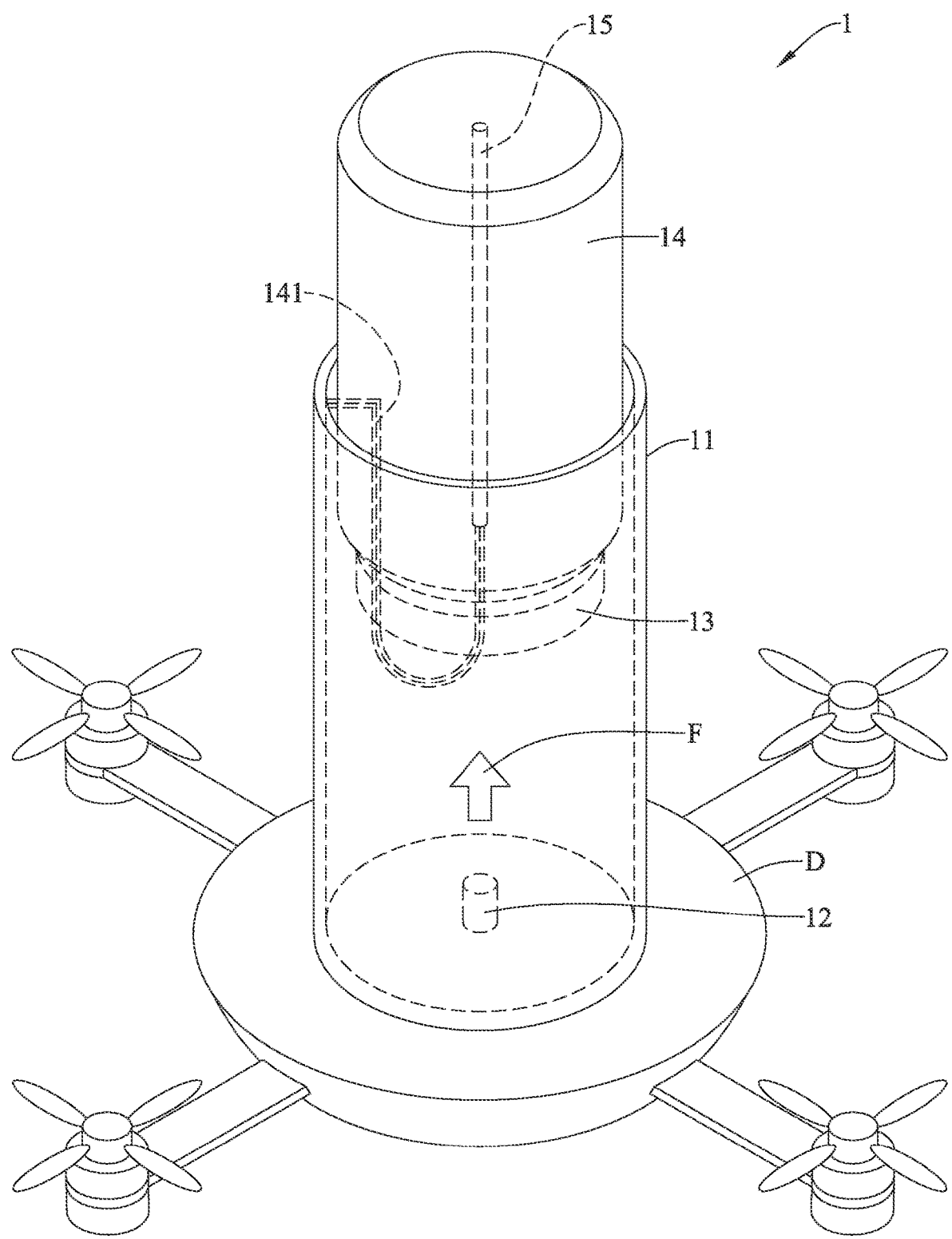

As shown in FIG. 2B, when the parachute system is triggered, the power source 12 of the opening device 1 is activated to generate a thrust (symbolized by F in the figure) for pushing the base 13, the parachute body 14 and the open-assist member 15, such that the base 13, the parachute body 14 and the open-assist member 15 are pushed to leave the bottom of the container 11.

Figure 2C:
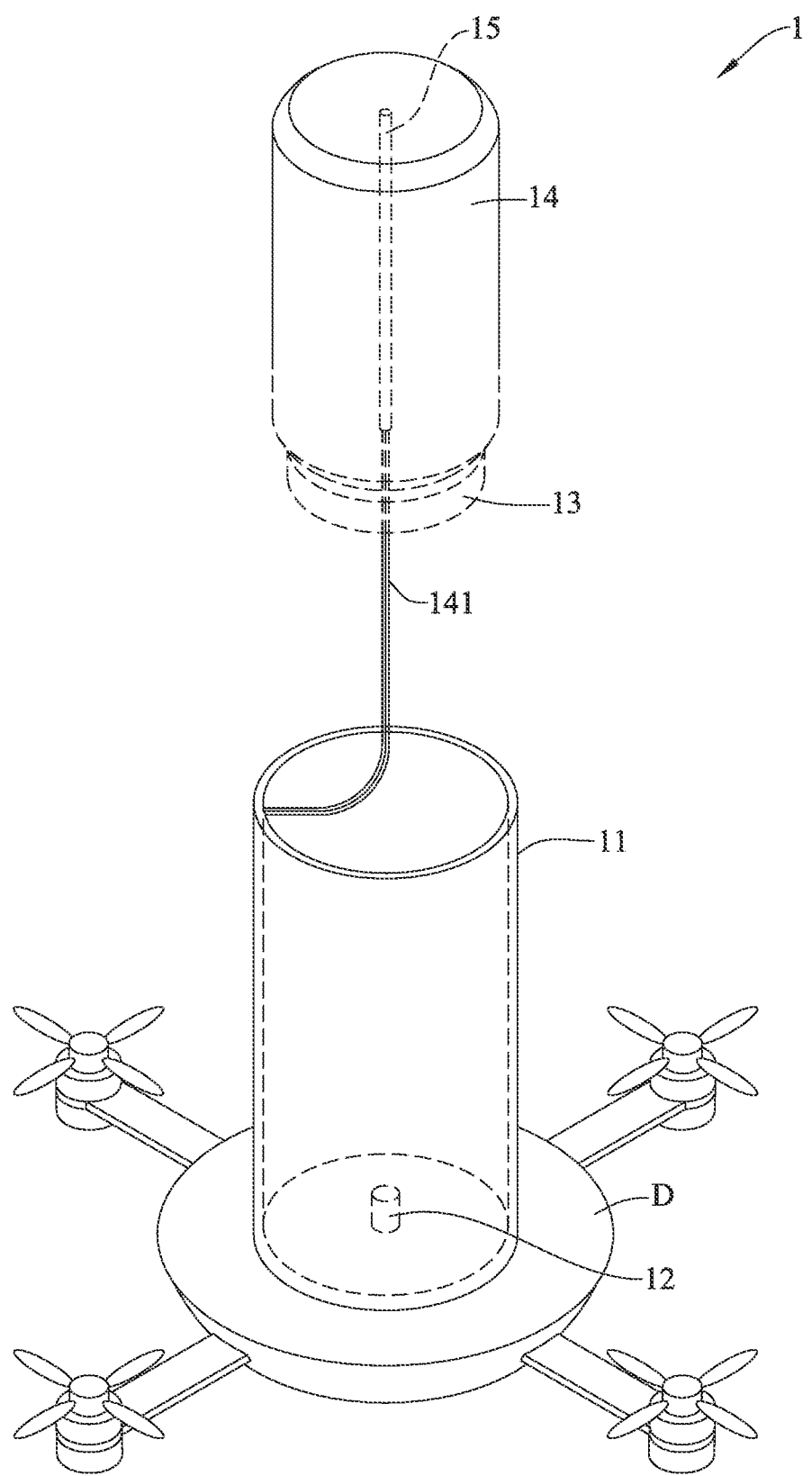

As shown in FIG. 2C, when the base 13, the parachute body 14 and the open-assist member 15 are completely detached away from the container 11, inertia of the base 13, the parachute body 14 and the open-assist member 15 would keep the base 13, the parachute body 14 and the open-assist member 15 as an assembly, particularly by having the open-assist member 15 to continuously contact the center of the parachute. In another embodiment, the base 13 can be fixed internally to the container 11. In other words, the base 13 can utilize a specific mechanism to push both the parachute body 14 and the open-assist member 15 away from the container 11. However, in this embodiment, the base 13 would remain inside the container 11, and not leave therefrom with the parachute body 14 and the open-assist member 15. In another embodiment, another specific mechanism can enable the base 13 and the open-assist member 15 to push the parachute body 14 to leave away the container 11, with both the base 13 and the open-assist member 15 remaining inside the container 11.

Figure 2D:
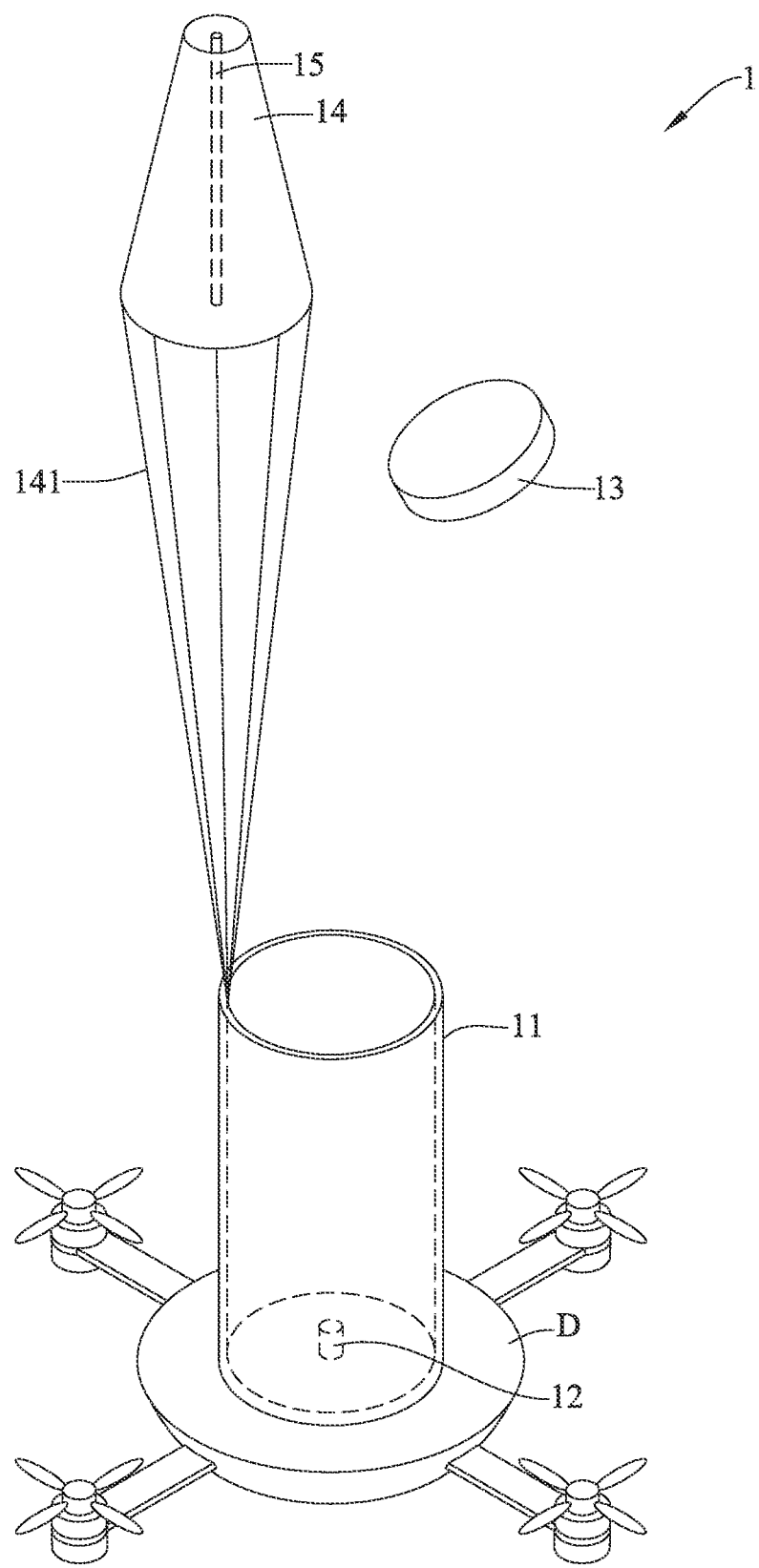

As shown in FIG. 2D, in this embodiment, the base 13 and the open-assist member 15 would keep contacting the center of the parachute of the parachute body 14, till the plurality of parachute cords 141 connected to the parachute body 14 are pulled straight. At this moment, the base 13 would drop away, but to have the open-assist member 15 to keep contacting the center of the parachute of the parachute body 14. Some air would enter the parachute body 14 to slightly expand the parachute body 14.

Figure 2E:
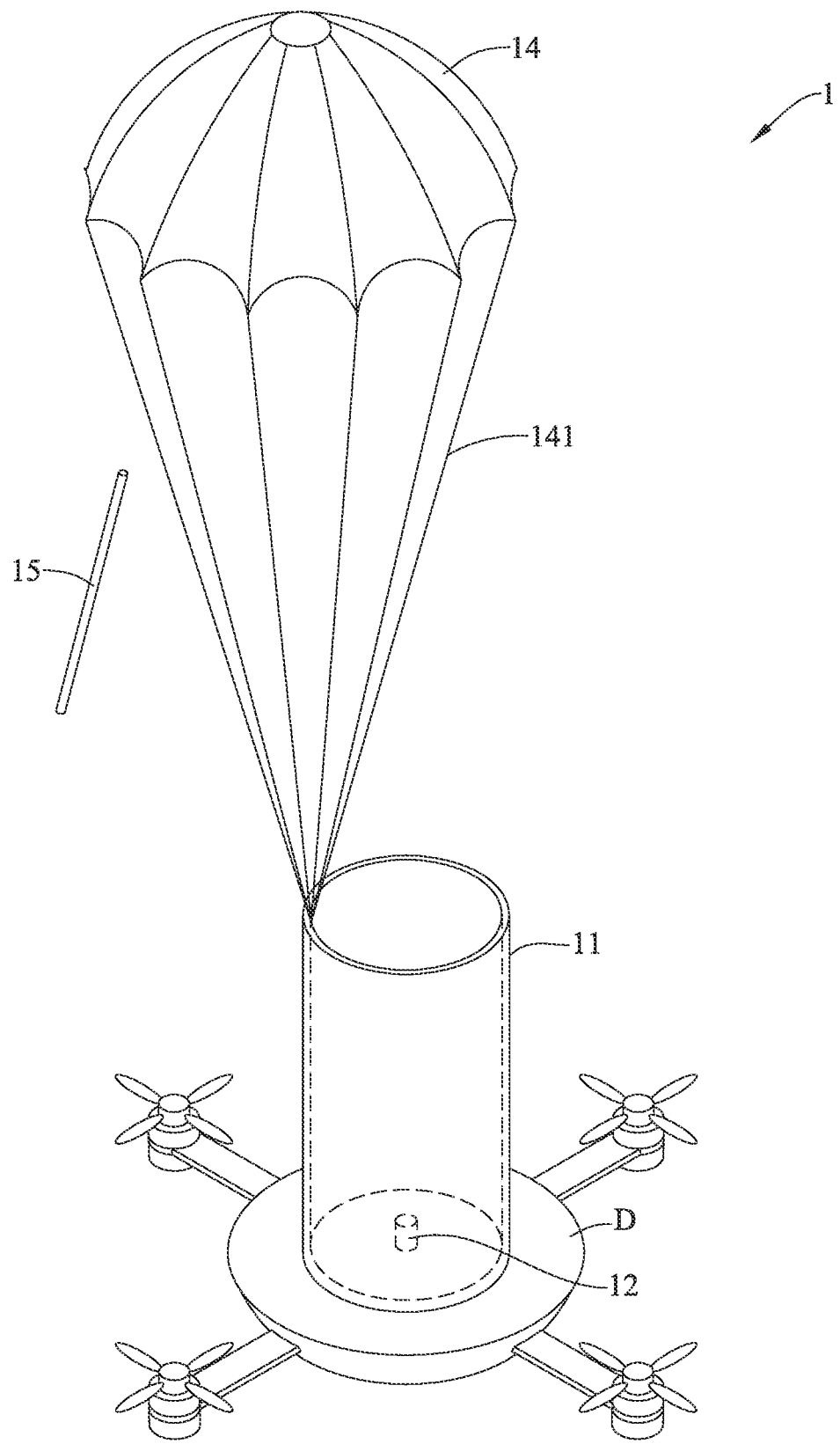

As shown in FIG. 2E, when the air enters the parachute body 14 to expand the parachute body 14 and each of the plurality of parachute cords 141 is straightened up, more air would quickly enter the parachute body 14, and thus the parachute body 14 can be fully expanded. Then, the open-assist member 15 would drop due to loss of kinetic energy. At this time, the parachute body 14 is in a parachute-open status.

As described above, since the parachute device for drone 1 is equipped with the open-assist member 15 to integrate the base 13 through specific structures, thus the base 13 and the open-assist member 15 can keep pushing the parachute body 14 at the center of the inner surface thereof upon when the parachute body 14 in the folded status is leaving the container 11. Thereby, the parachute cords 141 and the parachute body 14 can be pulled straightly so as to quickly prepare the parachute body 14 for reaching the parachute-open status. Thus, the parachute-opening time of the parachute can be significantly shortened. Through the aforesaid opening mechanism, the lower critical parachute-opening altitude for the drone D can be greatly reduced, and the spatial protection range of the parachute can be extended, such that the drone D can be applied to carry out a low-altitude cargo delivery. Namely, applications of the drone can be much more versatile.

Figure 3:
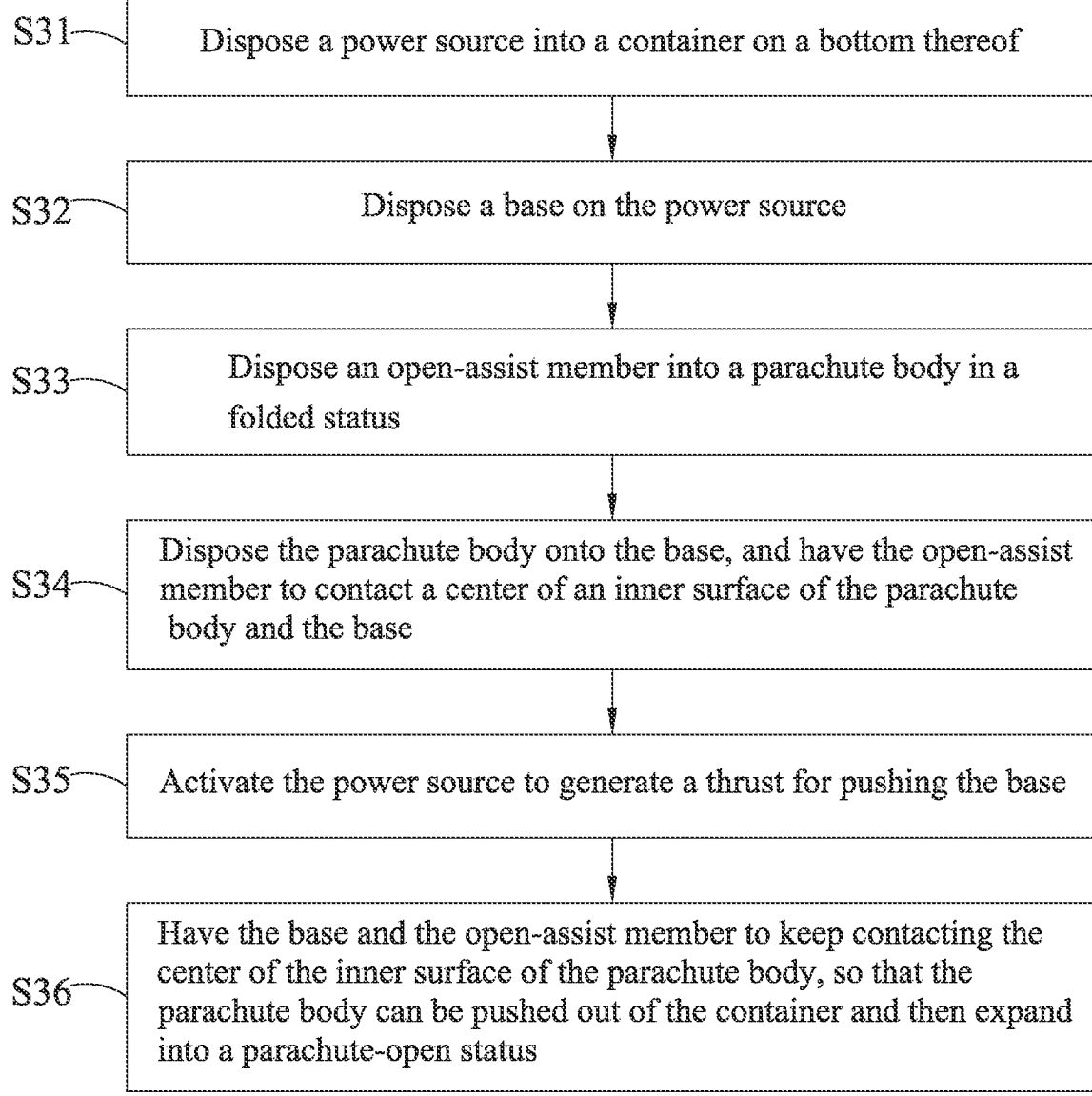
FIG. 3 is a flowchart of an embodiment of the method for opening the parachute of drone of FIG. 1.

Referring to FIG. 3, a flowchart of an embodiment of the method for opening the parachute of drone of FIG. 1 is shown. In this embodiment, the method for opening a parachute of drone includes the following steps.

S31: Dispose a power source into a container on a bottom thereof.

S32: Dispose a base on the power source.

S33: Dispose an open-assist member into a parachute in a folded status (parachute body).

S34: Dispose the parachute body onto the base, and have the open-assist member to contact a center of an inner surface of the parachute body and the base.

S35: Activate the power source to generate a thrust for pushing the base.

S36: Have the base and the open-assist member to keep contacting the center of the inner surface of the parachute body, so that the parachute body can be pushed out of the container and then expand the parachute into a parachute-open status.

Figure 4:
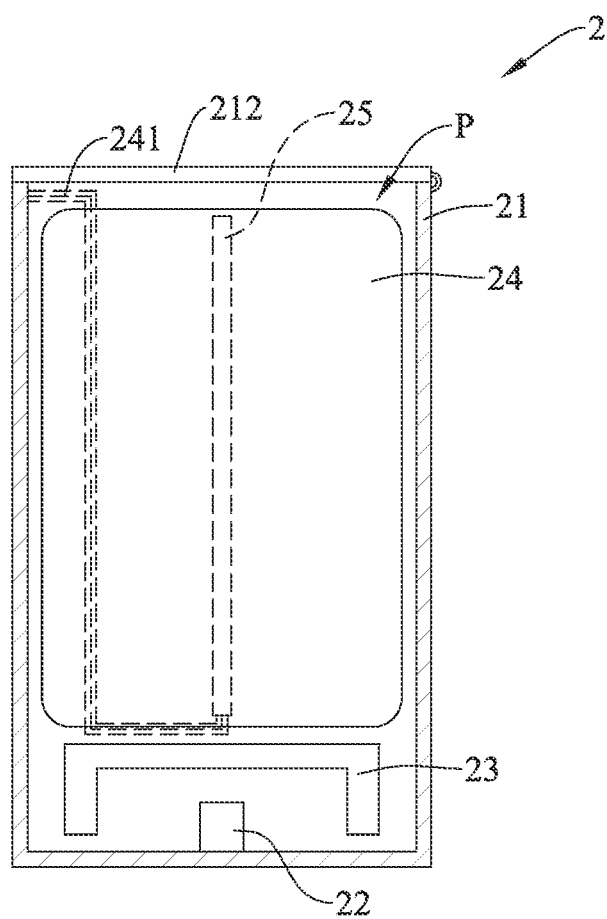
FIG. 4 is a schematic cross-sectional view of another embodiment of the parachute device for drone in accordance with this disclosure.

Referring to FIG. 4, a schematic cross-sectional view of another embodiment of the parachute device for drone in accordance with this disclosure is shown. In this embodiment, the parachute device for drone 2 includes a container 21, a power source 22, a base 23, a parachute body 24 and an open-assist member 25.

Descriptions upon the listed elements of this embodiment that are structurally resembled to those of the aforesaid embodiment 1 would be omitted herein. The difference between this instant and the aforesaid embodiments is that, in this embodiment, the container 21 of the parachute device for drone 2 further includes an upper cover 212 disposed at a top of the container 21 for covering the opening P thereof.

In addition, in this embodiment, the base 23 is a U-shape base with a concave end facing down toward the power source 22. Definitely, structuring of the base 23 can be varied, but to meet practical needs.

When the power source 22 of the opening device for a parachute of drone 2 is yet to be activated, the upper cover 212 is to cover the opening P of the container 21. while the power source 22 of the opening device for a parachute of drone 2 is activated, the power source 22 would generate a thrust to push the base 23, the parachute body 24 and the open-assist member 25, so as to push the base 23, the parachute body 24 and the open-assist member 25 to leave the bottom of the container 21. The parachute body 24 would push the upper cover 212 to open, so that the base 23, the parachute body 24 and the open-assist member 15 can be pushed up to leave the container 21.

The aforesaid embodiment is not used to provide limitations the scope of this disclosure, but one of many exemplary examples. Definitely, structuring, connecting and assembling of elements of the aforesaid parachute device for drone 2 can be varied according to different requirements.

Figure 5:
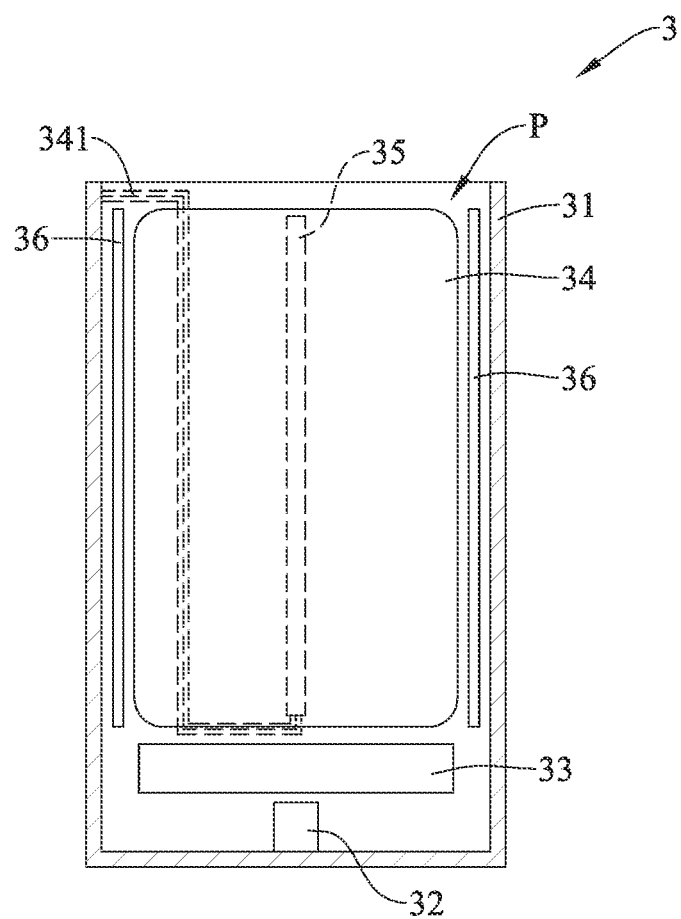
FIG. 5 is a schematic cross-sectional view of a further embodiment of the parachute device for drone in accordance with this disclosure.

Referring to FIG. 5, a schematic cross-sectional view of a further embodiment of the parachute device for drone in accordance with this disclosure is shown. In this embodiment, the parachute device for drone 3 includes a container 31, a power source 32, a base 33, a parachute body 34, an open-assist member 35 and a plurality of protective shells 36.

The top of the container 31 has an opening P. In this embodiment, the container 31 can be a hollow cylindrical container.

The power source 32 is disposed on a bottom of the container 31. In this embodiment, the power source 32 is a compressed gas device, such as a $CO_2$ compressed gas device.

The base 33, disposed on the power source 32, is structured to match the power source 32. In this embodiment, the base 13 is a planar base.

The parachute body 34, disposed on the base 33, is stored in a folded status above the base 33 inside the container 31. In this embodiment, the open-assist member 35 is a pole having two opposite ends. One end of the open-assist member 35 contacts at a center of an inner surface of the parachute body 34, while another end thereof contacts against the base 33. Similarly, the altitude of the end of the open-assist member 35 that contacts the center of the inner surface of the parachute body 34 is slightly lower than or equal to the altitude of the opening P of the container 31. In another embodiment, the open-assist member 35 can be differently structured to some other relevant member.

The plurality of protective shells 36 is disposed between the parachute body 34 and the inner wall of the container 31. In this embodiment, the parachute device for drone 3 can include two protective shells 36, disposed to opposite sides of the parachute body 34, respectively. In another embodiment, the parachute device for drone 3 can have simply a protective shell 36 or at least three protective shells 36. Each of the protective shells 36 has a surface coating of an auxiliary material for reducing friction. For example, the auxiliary material can be a talcum powder, a prickly heat powder or any material the like. With this auxiliary material, the friction between the parachute body 34 and inner wall of the container 31 can be significantly reduced. Thereupon, while the parachute body 34 is pushed by the thrust generated by the power source 32, it would be much easier for the parachute body 34 to leave the container 31. As such, the majority energy released by the power source 32 would be applied to the parachute body 34, and so energy loss at the power source 32 can be substantially reduced. In this embodiment, the protective shell 36 can be thin, light and made of a material with specific rigidity. In this embodiment, the protective shell 36 can be a plastic shell. In another embodiment, the protective shell 36 can be also a metallic shell or any shell made of a relevant material. In this embodiment, each of the protective shells 36 is slightly longer than the parachute body 34 in the folded status. In another embodiment, each of the protective shells 36 has a length substantially equal to the length of the inner wall of the container 31. In one further embodiment, the plurality of protective shells 36 can be disposed on the base 33, while the base 33 is pushed by the thrust applied by the power source 32, the parachute body 34, the open-assist member 35 and the plurality of protective shells 36 are pushed as well. In this disclosure, the quantity, material and dimensions of the plurality of protective shells 36 are determined according to practical requirements.

In addition, a plurality of parachute cords 341 (dashed lines in the figure) are included to connect the parachute body 34. The plurality of parachute cords 341 can be fixed to the container 31. In another embodiment, the plurality of parachute cords 341 can be also fixed to the body of the drone that is equipped with the parachute device 3.

The aforesaid embodiment is not used to provide limitations the scope of this disclosure, but one of many exemplary examples. Definitely, structuring, connecting and assembling of elements of the aforesaid parachute device for drone 3 can be varied according to different requirements.

Figure 6A:
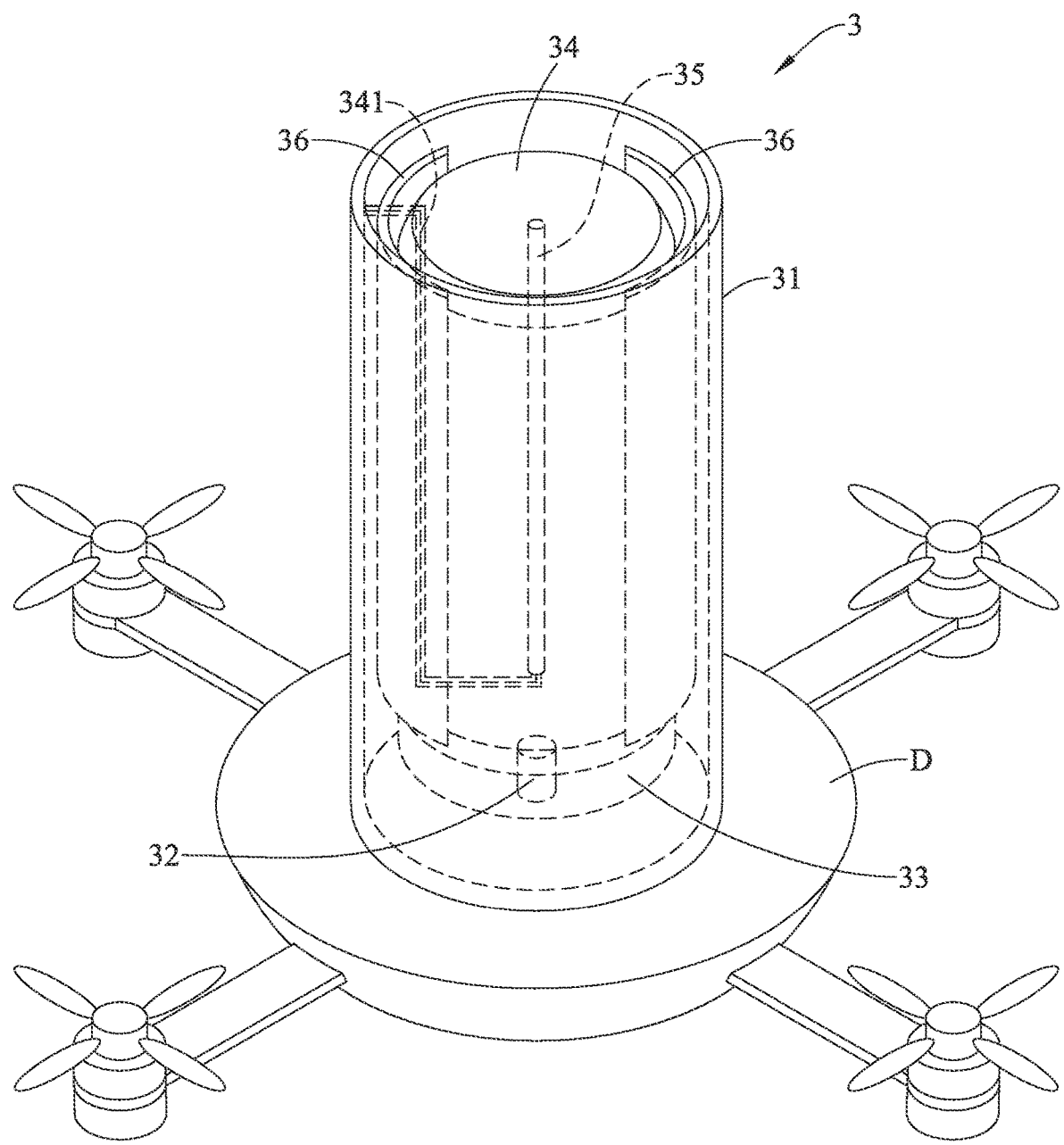
FIG. 6A~FIG. 6E demonstrate orderly and schematically different stages of a parachute-opening process of the parachute device for drone of FIG. 5.

Referring to FIG. 6A~FIG. 6E, different stages of a parachute-opening process of the parachute device for drone of FIG. 5 are demonstrated orderly and schematically. As shown in FIG. 6A, while the opening device for the parachute of drone 3 is positioned on the drone D, the parachute body 34 is collected inside the opening device 3 in the folded status.

Figure 6B:
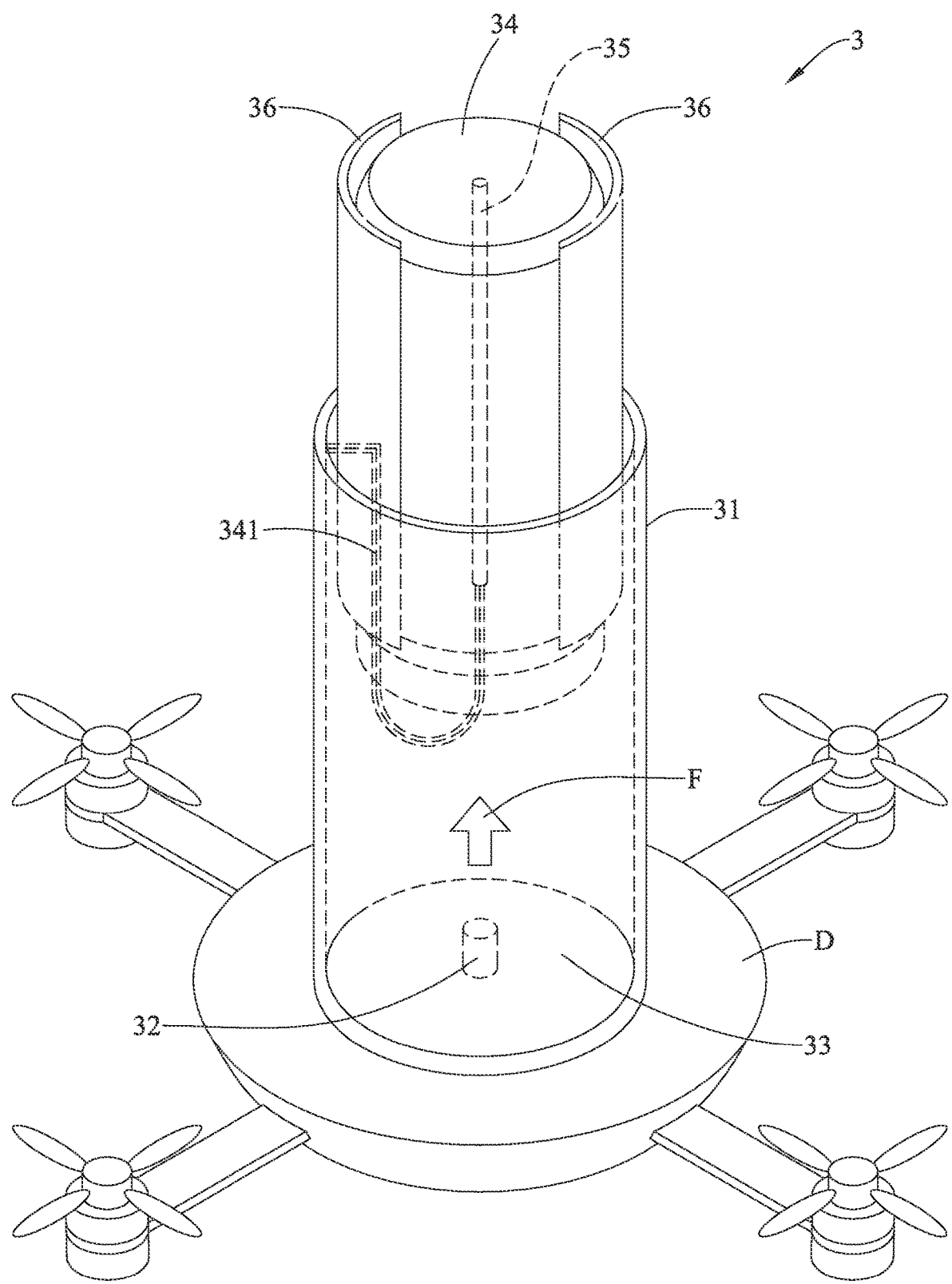

As shown in FIG. 6B, when the drone D is prepared to land, the power source 32 of the opening device 3 is activated to generate a thrust (symbolized by F in the figure) for pushing the base 33, the parachute body 34, the open-assist member 35 and the plurality of protective shells 36, such that the base 33, the parachute body 34, the open-assist member 35 and the plurality of protective shells 36 are pushed to leave the bottom of the container 31. As described above, the surface of each of the plurality of protective shells 36 is coated with the auxiliary material for effectively reducing the friction between the parachute body 34 and the inner wall of the container 31. As such, when the parachute body 34 is subjected to the thrust generated by the power source 32, it would be easier for the parachute body 34 to leave the container 31. In another embodiment, the plurality of protective shells 36 can be fixed to the inner wall of the container 31, and then, when the power source 32 of the opening device for a parachute of drone 3 is activated to generate the thrust to push the base 33, the parachute body 34 and the open-assist member 35 to leave away the container 31, the plurality of protective shells 36 can still remain inside the container 31.

Figure 6C:
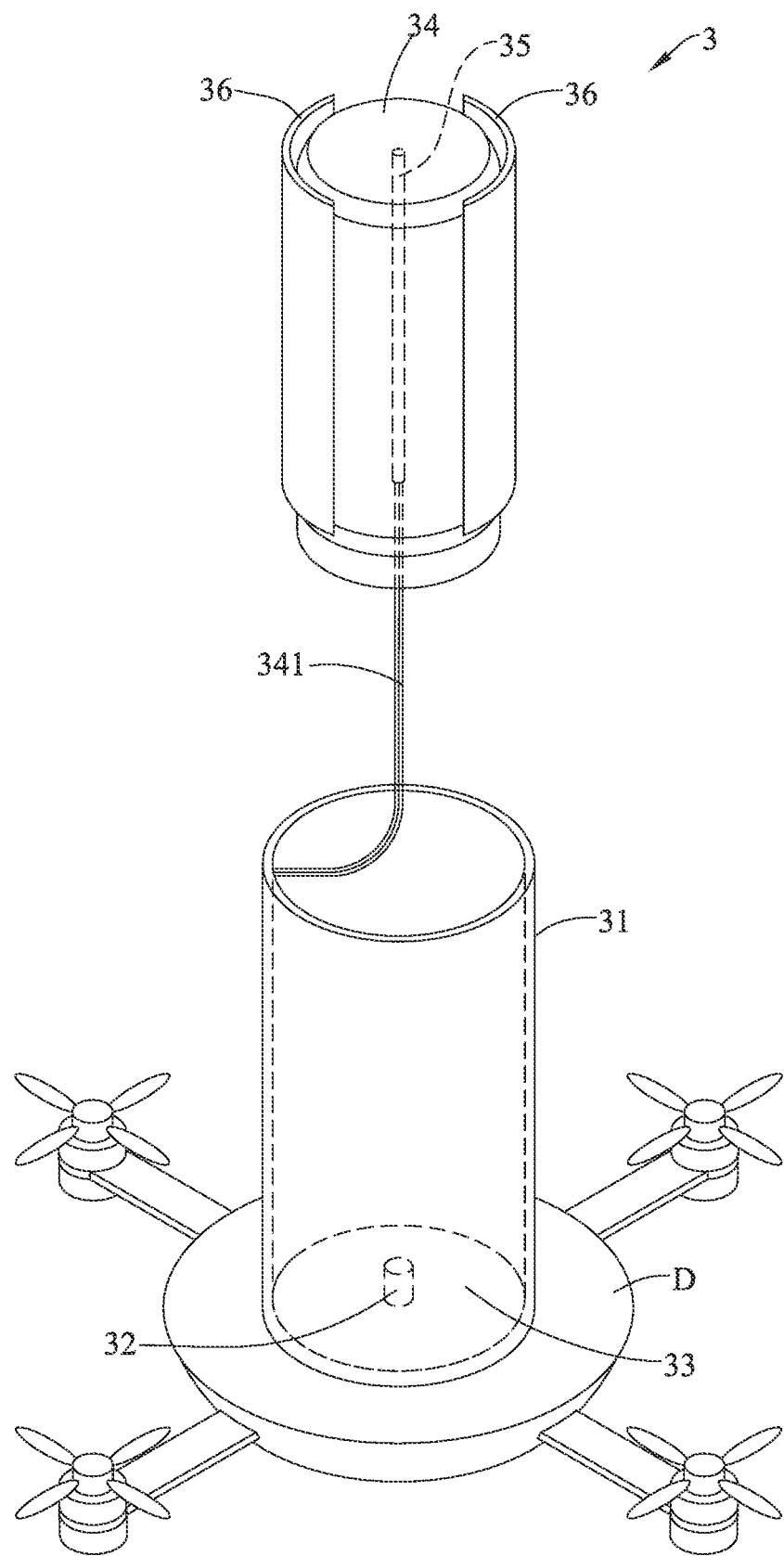

As shown in FIG. 6C, when the base 33, the parachute body 34, the open-assist member 35 and the plurality of protective shells 36 are completely detached away from the container 31, inertia of the base 33 and the open-assist member 35 would have the base 33 to keep pushing the open-assist member 35, and also the open-assist member 35 keeps pushing the center of the parachute of the parachute body 34. The plurality of protective shells 36 would keep contacting the parachute body 34 for a time duration, such that the parachute body 34 can temporarily maintain the folded status.

Figure 6D:
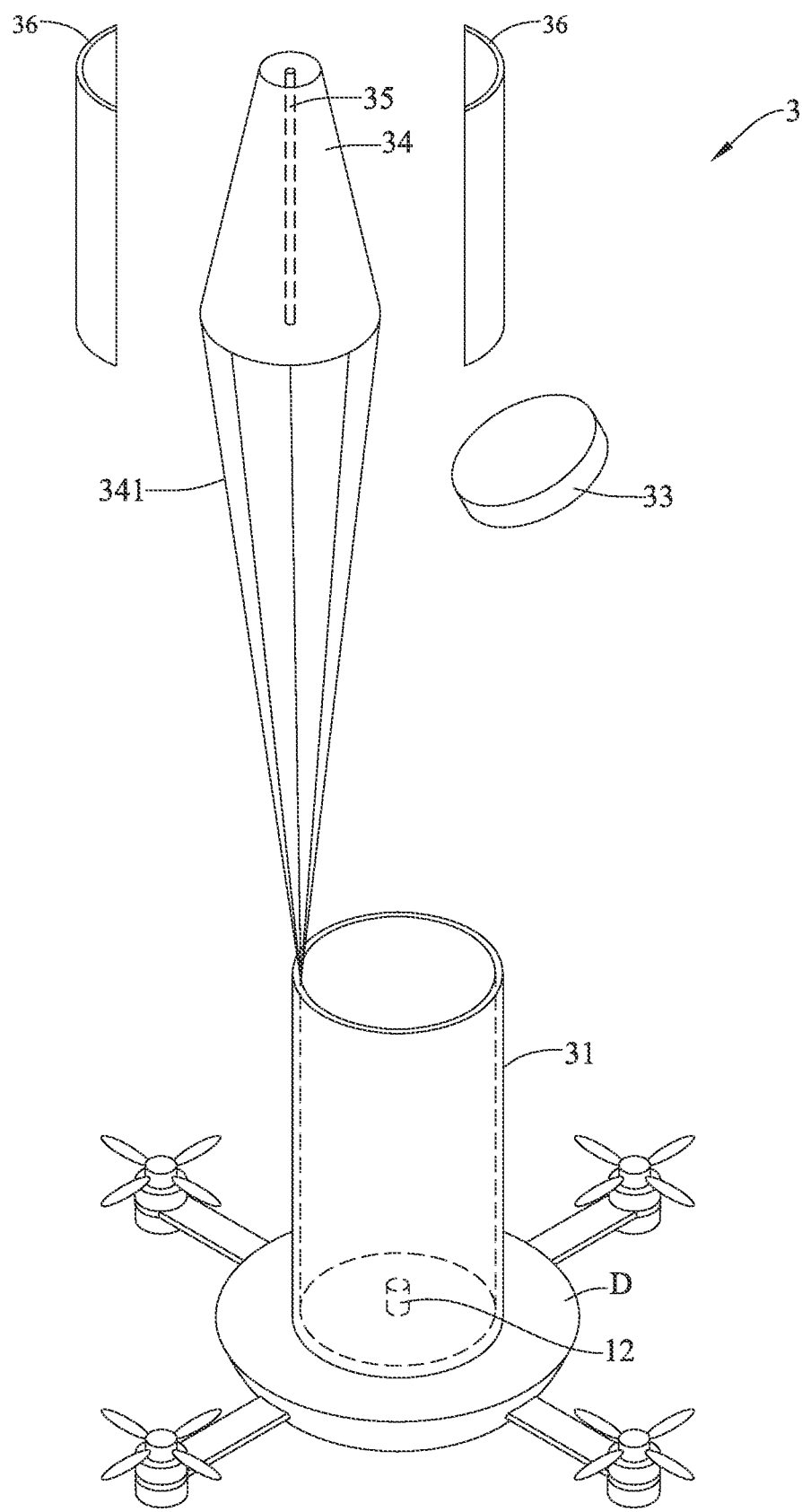

As shown in FIG. 6D, in this embodiment, the base 33 and the open-assist member 35 would keep pushing at the center of the parachute of the parachute body 34, till the plurality of parachute cords 341 connected to the parachute body 34 are pulled straight. At this moment, the base 33 and the plurality of protective shells 36 would drop away due to loss of kinetic energy, but meanwhile the open-assist member 35 keeps pushing at the center of the parachute of the parachute body 34. Some air would enter the parachute body 34 to slightly expand the parachute body 34.

Figure 6E:
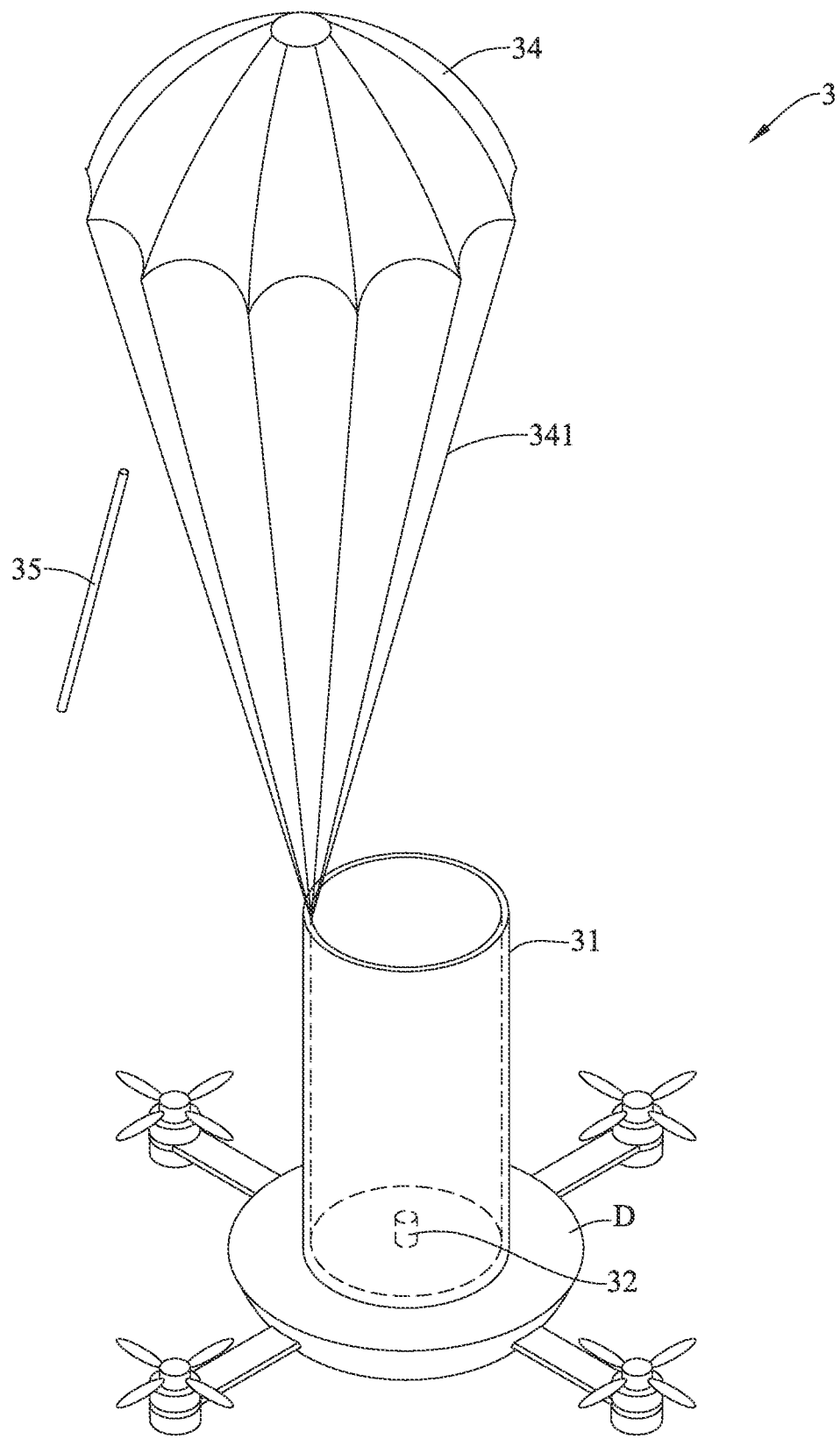

As shown in FIG. 6E, when the air enters the parachute body 34 to expand the parachute body 34 and each of the plurality of parachute cords 341 is straightened up, more air would quickly enter the parachute body 34 so as to completely expand the parachute body 34. Then, the open-assist member 35 would drop also due to loss of kinetic energy. At this time, the parachute body 34 is in the parachute-open status.

As described above, since the parachute device for drone 3 is equipped with the open-assist member 35 to integrate the base 33 through specific structures, thus, when the parachute body 34 in the folded status is leaving the container 31, the base 33 and the open-assist member 35 can keep pushing the parachute body 34 at the center of the inner surface thereof. Thereby, the parachute cords 341 can be pulled straightly so as to quickly have the parachute body 34 to expand and reach the parachute-open status. In addition, since the parachute device for drone 3 of this embodiment further includes the plurality of protective shells 36 coated with the auxiliary material for effectively reducing the friction and the loss of energy released by the power source 32. Thus, the majority energy released by the power source 32 would be applied to the parachute body 34, and so the parachute-opening time of the parachute body 34 can be further reduced. In this embodiment, triggering of the parachute-opening process would activate the power source 32 to generate the thrust for driving the base 33 and the parachute body 34 to leave the container 31. In some other embodiments, the thrust generated by the power source 32 would drive the open-assist member 35 as well.

Through the aforesaid opening mechanism, the lower critical parachute-opening altitude for the drone D can be further reduced, and so the drone D can be applied to carry out a low-altitude cargo delivery. Namely, applications of the drone can be much more versatile.

Furthermore, since the conventional parachute device for drone is limited to its structuring, thus the lower critical parachute-opening altitude can't be effectively reduced, and so a low-altitude cargo delivery is unfeasible. Namely, applications of the conventional parachute device for drone are quite limited. On the other hand, according to embodiments of this disclosure, the parachute device for drone includes the open-assist member keeps pushing the parachute body at the center of the inner surface thereof when the parachute in the folded status is released from the container, and thus the parachute cords can be pulled straightly so as to allow the parachute to quickly reach the parachute-open status. Thereupon, the parachute-opening time can be significantly shortened.

In addition, according to the aforesaid embodiment, the parachute device for drone includes the protective shells disposed between the parachute and the inner wall of the container. In particular, each of the protective shells is coated with the auxiliary material for reducing the friction, and thus loss of energy generated by the power source can be effectively reduced. Therefore, majority energy released by the power source can be applied to the parachute, such that the parachute-opening time can be further shortened.

Also, according to the aforesaid embodiment, since the parachute device for drone can shorten the parachute-opening time, and thus the lower critical parachute-opening altitude for the drone can be reduced, so that the drone can be applied to execute a low-altitude cargo delivery. That is, the applications of the drone would be versatile and more widely.

Figure 7:
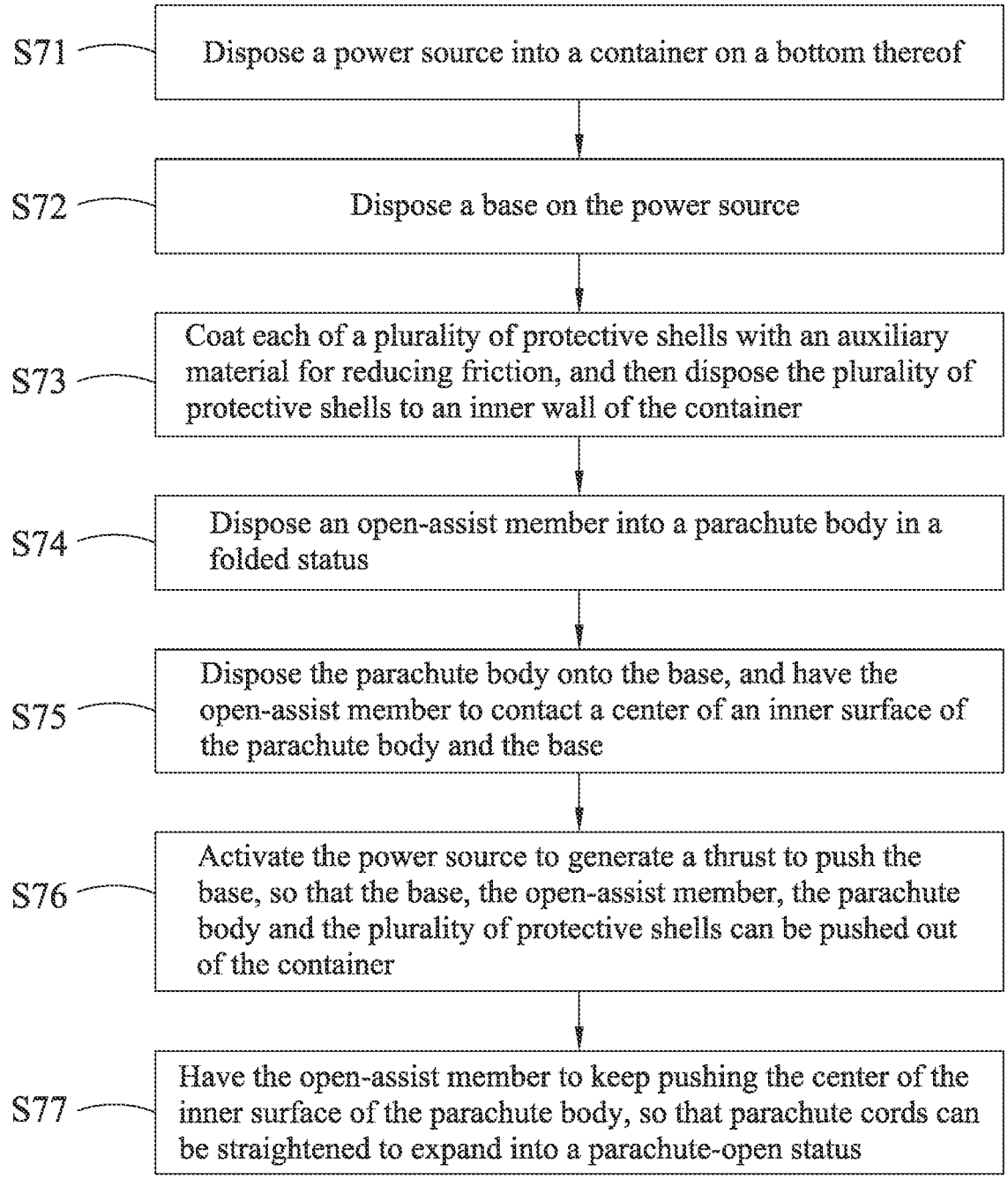
FIG. 7 is a flowchart of an embodiment of the method for opening the parachute of drone of FIG. 5.

Referring to FIG. 7, a flowchart of an embodiment of the method for opening the parachute of drone of FIG. 5 is shown. In this embodiment, the method for opening a parachute of drone includes the following steps.

S71: Dispose a power source into a container on a bottom thereof.

S72: Dispose a base on the power source.

S73: Coat each of a plurality of protective shells with an auxiliary material for reducing friction, and then dispose the plurality of protective shells to an inner wall of the container.

S74: Dispose an open-assist member into a parachute in a folded status (parachute body).

S75: Dispose the parachute body onto the base, and have the open-assist member to contact a center of an inner surface of the parachute body and the base.

S76: Activate the power source to generate a thrust to push the base, so that the base, the open-assist member, the parachute and the plurality of protective shells can be pushed out of the container.

S77: Have the open-assist member to keep pushing the center of the inner surface of the parachute body, so that parachute cords can be straightened to expand the parachute to reach a parachute-open status.

In summary, according to the embodiments of this disclosure, the parachute device for drone includes the open-assist member to keep pushing the parachute body at the center of the inner surface thereof. Thereupon, the parachute can reach the parachute-open status much more rapidly, and thus the parachute-opening time of the parachute can be significantly shortened.

Further, according to the embodiments of this disclosure, the parachute device for drone includes the protective shells disposed between the parachute and the inner wall of the container and coated with the auxiliary material for reducing the friction, and thus the loss of energy released by the power source can be effectively reduced. Also, the majority energy released by the power source can be applied to the parachute body, and so the parachute-opening time of the parachute can be further reduced.

In addition, according to the embodiments of this disclosure, the parachute device for drone can shorten the parachute-opening time much easier, and thus the lower critical parachute-opening altitude can be further lowered to make the low-altitude cargo delivery feasible to the drone.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A parachute device for drone, comprising:
   a container, having an opening disposed at a top thereof;
   a power source, disposed on a bottom of the container;
   a base, disposed on the power source;
   a parachute body, disposed on the base, being in a folded status;
   a protective shell, disposed between the parachute body and an inner wall of the container; and
   an open-assist member, disposed in the parachute body, wherein the open-assist member contacts the base and a center of an inner surface of the parachute body.

2. The parachute device for drone of claim 1, wherein the open-assist member is one of a pole, an elastic support and a retractable part, one end of the open-assist member contacts the center of the inner surface of the parachute body, and another end of the open-assist member contacts the base.

3. The parachute device for drone of claim 2, wherein an altitude of the end of the open-assist member that contacts the center of the inner surface of the parachute body is lower than that of the opening of the container.

4. The parachute device for drone of claim 1, wherein the container is one of a hollow cylindrical container or a hollow polygonal container.

5. The parachute device for drone of claim 1, wherein the container includes an upper cover disposed at the top of the container for covering the opening.

6. The parachute device for drone of claim 1, wherein the power source is one of a spring, a chemical kit and a compressed gas device.

7. He parachute device for drone of claim 1, wherein the base is a U-shape base with a concave end facing toward the power source.

8. The parachute device for drone of claim 1, further including a plurality of parachute cords connecting the parachute body, wherein each of the plurality of parachute cords is fixed to one of the container and a body of the drone.

9. The parachute device for drone of claim 1, wherein the protective shell is disposed on the base.

10. The parachute device for drone of claim 1, wherein the protective shell is fixed to the inner wall of the container.

11. The parachute device for drone of claim 1, wherein the protective shell is one of a plastic shell and a metallic shell.

12. The parachute device for drone of claim 1, wherein the protective shell is coated with an auxiliary material for reducing friction.

13. The parachute device for drone of claim 12, wherein the auxiliary material is one of a talcum powder and a prickly heat powder.

14. A method for opening a parachute of drone, comprising:
   (a) disposing a power source into a container on a bottom thereof;
   (b) disposing a base on the power source;
   (c) disposing an open-assist member into a parachute body in a folded status;
   (d) disposing the parachute body onto the base, and having the open-assist member to contact the base and a center of an inner surface of the parachute body, and disposing a protective shell between the parachute body and an inner wall of the container;
   (e) activating the power source to generate a thrust for pushing the base; and
   (f) having the base and the open-assist member to keep contacting the center of the inner surface of the parachute body, so that the parachute body is pushed out of the container and then expands into a parachute-open status.

15. The method for opening a parachute of drone of claim 14, in the (d), further including: having an altitude of the end of the open-assist member that contacts the center of the inner surface of the parachute body to be lower than that of the opening of the container.

16. The method for opening a parachute of drone of claim 14, in the (f), further including: having the open-assist member to push the center of the inner surface of the parachute body to straighten a plurality of parachute cords connecting the parachute body to one of the container and a body of the drone.

17. The method for opening a parachute of drone of claim 14, further including: coating the protective shell with an auxiliary material for reducing friction.

18. The method for opening a parachute of drone of claim 14, further including having the protective shell to leave the container with the parachute body.

* * * * *